(12) United States Patent
Murai et al.

(10) Patent No.: US 9,878,537 B2
(45) Date of Patent: Jan. 30, 2018

(54) IMAGE FORMING METHOD (71) Applicant: Seiko Epson Corporation, Tokyo (JP)

(72) Inventors: Masayuki Murai, Matsumoto (JP);
Masakazu Ohashi, Shiojiri (JP); Ryota Miyasa, Matsumoto (JP); Kosuke Chidate, Suwa (JP); Takako Sugiyama, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/465,028

(22) Filed: Mar. 21, 2017

(65) Prior Publication Data
US 2017/0282557 A1 Oct. 5, 2017

(30) Foreign Application Priority Data

Apr. 5, 2016 (JP) .................................. 2016-075655

(51) Int. Cl.
*B41J 2/14* (2006.01)
(52) U.S. Cl.
CPC ................................ *B41J 2/14201* (2013.01)

(58) Field of Classification Search
CPC ................ B41J 2/14201; B41J 2/14209; B41J 2/14233; B41J 2/14274; B41J 2/14282
See application file for complete search history.

(56) References Cited

U.S. PATENT DOCUMENTS 7,018,458 B2 * 3/2006 Knott .................... C08G 77/46
106/31.6
8,613,509 B2 12/2013 Nagase et al.

FOREIGN PATENT DOCUMENTS

JP 2011-246633 A 12/2011

* cited by examiner

*Primary Examiner* — Juanita D Jackson
(74) *Attorney, Agent, or Firm* — Harness, Dickey & Pierce, P.L.C.

(57) ABSTRACT

An image forming method includes discharging an ink jet ink composition which contains a diketopyrrolopyrrole pigment and a solvent having a SP value of equal to or lower than 13 by using an apparatus including a piezo ink jet head satisfying the following Expression (1).

$$0.13 \leq \{(\text{discharge amount per droplet ejection})/(\text{volume of ink pressure chamber})\} \times 100 \quad (1)$$

11 Claims, 3 Drawing Sheets

IMAGE FORMING METHOD

BACKGROUND

1. Technical Field

The present invention relates to an image forming method.

2. Related Art

In the related art, a printing method of recording an image on fabric such as woven fabric, knitted fabric, and nonwoven fabric is known, and recently, the use of an ink jet recording method has been under consideration from the viewpoint that ink used for printing can be used efficiently. In the ink jet printing method using the aforementioned ink jet recording method, a droplet-shaped ink is discharged from a nozzle of a head, and adheres to fabric so as to from an image of an ink coating film on the fabric.

The ink used for such an ink jet printing method consists of a coloring material such as pigments or dyes, a dispersant (a surfactant), and a solvent (water, an organic solvent, or the like). Here, when dyes are used as a coloring material, there is a tendency that the properties such as light fastness of an image to be recorded are not excellent, and thus a pigment printing in which a pigment is used as a coloring material has been used. In the pigment printing, further higher color developing properties and abrasion resistance are required, and in order to meet the requirements, using a special color ink such as RED has been considered (for example, JP-A-2011-246633).

However, when a highly hydrophobic pigment such as diketopyrrolopyrrole is used, a foreign matter or a cavitation (a discharge error) is easily generated, and thus discharge stability cannot be secured, which is a problem. The occurrence of the foreign matter causes the hydrophobicity of diketopyrrolopyrrole used as a pigment to be high, and thus the dispersion stability in ink is not easily secured. On the other hand, the cavitation is expected to cause the diketopyrrolopyrrole pigment to contain microbubble nucleus.

SUMMARY

An advantage of some aspects of the invention is to provide an image forming method in which when a pigment ink is applied to a recording medium by using an ink jet method, the occurrence of a foreign matter derived from the pigment is suppressed and discharge errors are decreased so as to realize excellent discharge stability.

The invention can be realized in the following aspects or application examples.

Application Example 1

According to an aspect of an image forming method of the invention, the method includes discharging an ink jet ink composition which contains a diketopyrrolopyrrole pigment and a solvent having a SP value of equal to or lower than 13 by using an apparatus including a piezo ink jet head satisfying the following Expression (1).

$$0.13 \leq \{(\text{discharge amount per droplet ejection})/(\text{volume of ink pressure chamber})\} \times 100 \quad (1)$$

According to the image forming method of Application Example 1, it is possible to provide the image forming method in which when the specific ink and the specific head are used in combination, at the time of applying the pigment ink by using the ink jet method, the occurrence of a foreign matter derived from the diketopyrrolopyrrole pigment is suppressed, and discharge errors are decreased so as to realize excellent discharge stability. In addition, when the diketopyrrolopyrrole pigment is used as a pigment, it is possible to obtain an image in which the color developing properties and abrasion resistance which are particularly required in a printing field are secured.

Application Example 2

In this application example, the apparatus which further includes the piezo ink jet head may satisfy the following Expression (2).

$$0.13 \leq \{(\text{discharge amount per droplet ejection})/(\text{volume of ink pressure chamber})\} \times 100 \leq 0.18 \quad (2)$$

According to Application Example 2, when the head satisfying Expression (2) is used, it is possible to provide the image forming method which is excellent in the discharge stability. In addition, it is possible to realize excellent thin line expression.

Application Example 3

In this application example, the SP value of the solvent may be equal to or greater than 9.

According to Application Example 3, it is possible to provide the image forming method which is further excellent in the discharge stability.

Application Example 4

In this application example, the ink jet ink composition may contain the solvent in a range of 0.1% by mass to 10% by mass with respect to the total mass of the ink jet ink composition.

According to Application Example 4, it is possible to provide the image forming method in which the occurrence of a foreign matter derived from the diketopyrrolopyrrole pigment is further suppressed, and discharge errors are decreased so as to realize excellent discharge stability.

Application Example 5

In this application example, a recording medium may be fabric.

According to Application Example 5, it is possible to provide the image forming method in which when the pigment ink is applied to the fabric by using the ink jet method, the occurrence of a foreign matter derived from the pigment is suppressed, and discharge errors are decreased so as to realize excellent discharge stability. In addition, when a diketopyrrolopyrrole pigment is used as a pigment, it is possible to obtain an image in which the color developing properties and abrasion resistance which are particularly required in the printing field are secured.

Application Example 6

In this application example, the ink jet ink composition may be an aqueous ink composition.

According to Application Example 6, it is possible to provide the image forming method in which when the pigment ink is applied to the fabric by using the ink jet method, the occurrence of a foreign matter derived from the pigment is suppressed, and discharge errors are decreased so as to realize excellent discharge stability.

Application Example 7

In this application example, the diketopyrrolopyrrole pigment may be Pigment Red 254 or Pigment Red 255.

According to Application Example 7, it is possible to secure the color developing properties and abrasion resistance which are required in the printing field when the pigment ink is applied to the recording medium by using the ink jet method.

Application Example 8

In this application example, the solvent may include a solvent having a SP value in a range of 9.5 to 11.5.

According to Application Example 8, it is possible to provide the image forming method in which the occurrence of a foreign matter derived from the pigment is further suppressed, and discharge errors are decreased so as to realize excellent discharge stability.

Application Example 9

In this application example, the ink jet ink composition may contain the solvent in a range of 0.5% by mass to 5% by mass with respect to the total mass of the ink jet ink composition.

According to Application Example 9, it is possible to provide the image forming method in which the occurrence of a foreign matter derived from the pigment is further suppressed, and discharge errors are decreased so as to realize excellent discharge stability.

Application Example 10

In this application example, in ink jet ink composition, the solid concentration of the diketopyrrolopyrrole pigment may be in a range of 3% by mass to 10% by mass with respect to the total mass of the ink jet ink composition.

According to Application Example 10, it is possible to provide the image forming method in which the occurrence of a foreign matter derived from the pigment is further suppressed, and discharge errors are decreased so as to realize excellent discharge stability. In addition, when the diketopyrrolopyrrole pigment is used as the pigment, it is possible to obtain an image in which the color developing properties and abrasion resistance which are particularly required in the printing field are secured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Several embodiments of the invention will be described below. The embodiments described below are one example of the invention. The invention is not limited to the following embodiments at all and includes various modifications which are performed within the scope without departing the gist of the invention. Note that, not all of the configurations described below are necessary in the invention.

1. Image Forming Method

An image forming method according to one embodiment of the invention includes discharging an ink jet ink composition which contains a diketopyrrolopyrrole pigment and a solvent having a SP value of equal to or lower than 13 by using an apparatus including a piezo ink jet head satisfying the following Expression (1).

$$0.13 \leq \{(\text{discharge amount per droplet ejection})/(\text{volume of ink pressure chamber})\} \times 100 \qquad (1)$$

Hereinafter, regarding the image forming method according to the present embodiment, a configuration of an apparatus which can implement the aforementioned method, and steps of thereof will be described in detailed in order of ink compositions.

1.1. Configuration of Apparatus

An ink jet apparatus used in the image forming method according to the embodiment includes a piezo ink jet head (hereinafter, also simply referred to as a "head") which employs a piezo method of applying pressure and a recording information signal to ink at the same time with a piezoelectric element and discharging, and recording liquid droplets of the ink, as a method of discharging ink from a nozzle. Such an ink jet apparatus is provided with, for example, a piezo ink jet head which includes a nozzle for discharging an ink composition, a pressure chamber for imparting pressure to the ink composition so as to discharge the ink composition from the nozzle, and a connecting portion which connects the pressure chamber to the nozzle.

Hereinafter, the apparatus including a piezo ink jet head used in the embodiment will be described with reference to an on-carriage type printer in which an ink cartridge is mounted on a carriage as an example, and the apparatus including the piezo ink jet head used in the invention is not limited to an on-carriage type printer, and may be an off-carriage type printer in which an ink cartridge is fixed to the outside without being mounted on the carriage.

In addition, the printer used in the following description is a serial printer which includes a head mounted on a carriage moving in a predetermined direction, and discharges liquid droplets on a recording medium as the head moves in accordance with the movement of the carriage; however, the ink jet apparatus used in the invention is not limited to the serial printer, but may be a line printer in which the head is formed to be wider than the width of the recording medium and which discharges liquid droplets onto the recording medium without moving the head.

In the drawings used in the following description, the scale of each member is appropriately changed so as to be in a recognizable size.

Figure 1:
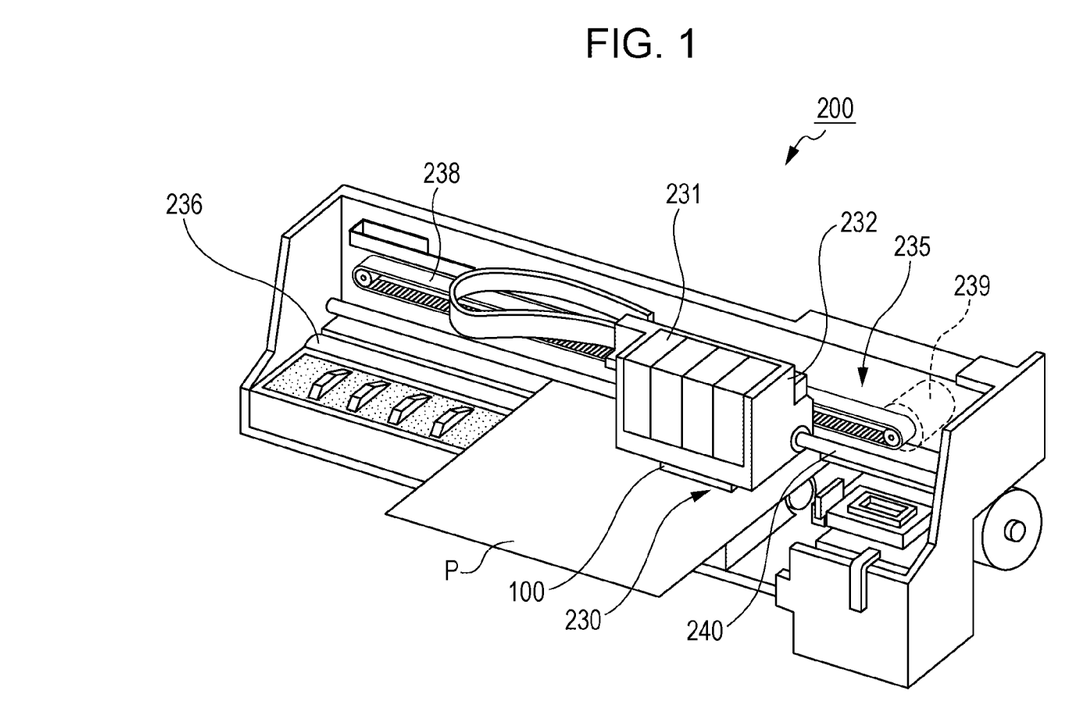
FIG. 1 is a schematic perspective view of an ink jet apparatus which performs an image forming method according to the present embodiment.

FIG. 1 is a schematic perspective view illustrating a printer 200 which is an example of an apparatus including a piezo ink jet head which performs the image forming method according to the embodiment, and the printer 200 performs recording on a recording medium P. When fabric is used as the recording medium P, ink jet printing can be performed. It is preferable to use the fabric as the recording medium in the embodiment. When the fabric is used as a recording medium, and a diketopyrrolopyrrole pigment is used as a pigment, it is possible to obtain an image in which the color developing properties and abrasion resistance are secured, which are particularly required in the printing field.

As illustrated in FIG. 1, the printer 200 includes a piezo type ink jet head (head) 100, a carriage 232 on which the head 100 is mounted and the ink cartridge 231 is detachably mounted, a main scanning mechanism 235 for reciprocating the carriage 232 in the medium width direction, and a platen roller 236 for transferring the recording medium in the medium feeding direction. The printer 200 further includes a control unit (not shown) for controlling the entire operations of the printer 200. Here, the medium width direction means a main scanning direction (a head scanning direction), and the medium feeding direction means a sub-scanning direction (a direction orthogonal to the main scanning direction).

The main scanning mechanism 235 includes a timing belt 238 which is connected to the carriage 232, a motor 239 which drives the timing belt 238, and a guide shaft 240 which is a supporting member supported in the main scanning direction. The carriage 232 is driven by the motor 239 via timing belt 238, and reciprocates in the main scanning direction along the guide shaft 240. At the time of the reciprocating, ink is discharged from the head 100 at predetermined timing, and the printing on the recording medium P is performed.

The head unit 230 includes an ink jet type recording head formed of the head 100 described below. The head unit 230 further includes an ink cartridge 231 for supplying ink to the head 100, and a transporting unit (a carriage) 232 on which the head 100 and the ink cartridge 231 are mounted.

In the embodiment, an example in which the printing is performed while moving both of the head 100 and the recording medium P is described; however, the printer 200 is not limited as long as it has a mechanism in which the printing is performed on the recording medium P by relatively changing the positions of the head 100 and the recording medium P each other.

Note that, the exemplified printer 200 includes one head 100, and can perform the printing on the recording medium P by using the aforementioned the head 100, but may include a plurality of heads. In a case where the printer 200 includes the plurality of heads, the plurality of heads may independently operate as described above, or may be one collected head by connecting the plurality of heads with each other. Examples of such a collected head include a line-type head in which each nozzle hole of the plurality of heads has a uniform interval as a whole.

1.1.1. Piezo Ink Jet Head

Figure 2:
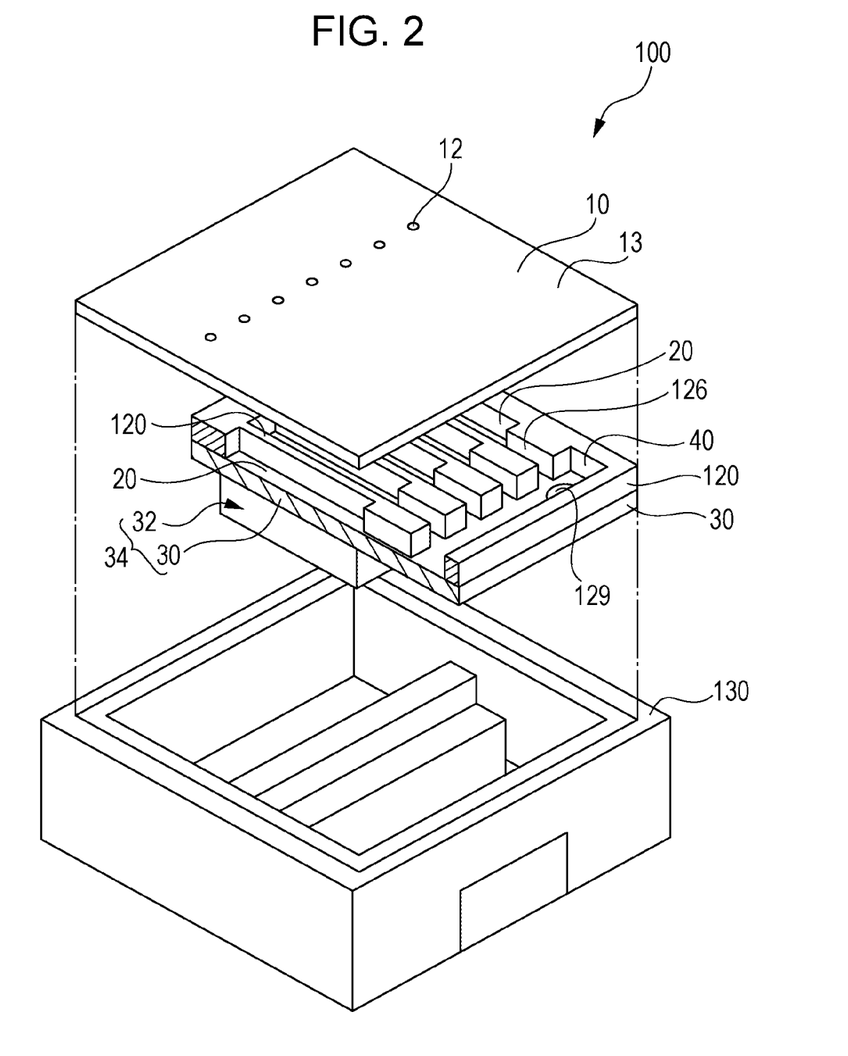
FIG. 2 is an exploded perspective view schematically illustrating a head of the ink jet apparatus.
Figure 3:
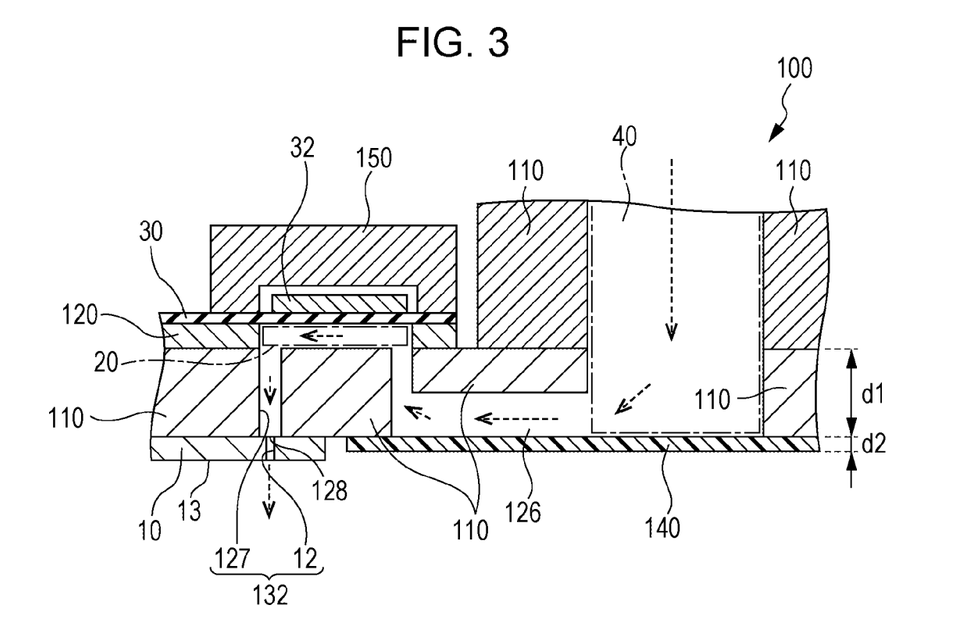
FIG. 3 is a schematic view of cross section of a main portion of the head of the ink jet apparatus.

FIG. 2 is an exploded perspective view schematically illustrating the head 100 in the printer 200, and illustrates a state in which the head 100 mounted on the printer 200 illustrated FIG. 1 is turned upside down. FIG. 3 is a schematic view of cross section of a main portion of the head 100, and schematically illustrates an ink flow from an ink supply room 40 to a nozzle hole 12 at the time of ink discharging operation by dashed arrows.

Note that, in FIGS. 2 and 3, a piezoelectric element 32 is schematically illustrated. In addition, in the embodiment, the head 100 is configured to include a communication plate 110 and a cover 150; however, the configuration thereof is not illustrated in FIG. 2.

As illustrated in FIG. 2, the head 100 is provided with a nozzle plate 10 including a plurality of the nozzle holes 12 on a surface facing a recording medium, a plurality of the pressure chambers 20 which communicate with the plurality of nozzle holes 12 formed on the nozzle plate 10, a diaphragm 30 which causes each volume of the plurality of pressure chambers 20 to be changed, an ink supply room 40 which supplies ink to the plurality of pressure chambers 20, and a case 130.

The nozzle plate 10 includes the plurality of nozzle holes 12 for discharging ink, the plurality of nozzle holes 12 are arranged in a matrix, and the nozzle surface 13 is formed on the surface of the nozzle plate 10. The number of the nozzle holes 12 provided on the nozzle plate 10 is not particularly limited. In the head 100 used in the embodiment, a nozzle density of the nozzle holes 12 in a column direction is preferably equal to or greater than 200 dpi. That is, an interval between the nozzle holes 12, which are adjacent to each other, in the arranged nozzle holes 12 is preferably equal to or smaller than 127 μm. When the nozzle density is set to be equal to or greater than 200 dpi, even in a case where the liquid droplets are miniaturized, it is possible to maintain the total ink discharging amount, and maintain the hiding properties of an image. The nozzle density is more preferably equal to or greater than 240 dpi, is still more preferably equal to or greater than 250 dpi, is still more preferably equal to or greater than 300 dpi, is still more preferably equal to or greater than 400 dpi, and most preferably equal to or greater than 500 dpi. The upper limit of the nozzle density is preferably equal to or lower than 2000 dpi, and is more preferably equal to or lower than 1000 dpi.

Examples of a material of the nozzle plate 10 include silicon and stainless steel (SUS). In addition, an alloy containing chromium (Cr) of equal to or greater than 10.5% with iron (Fe) as a main component (of equal to or greater than 50%) is more preferable as a material of the nozzle plate 10 from the aspect that both rigidity and rust resistance can be compatible. The thickness of the nozzle plate 10 is not particularly limited, and is preferably equal to or less than 50 μm, is more preferably equal to or less than 20 μm, and still more preferably in a range of 1 μm to 10 μm.

The head 100 is provided with a pressure chamber substrate 120 for forming the pressure chamber 20, and examples of a material of the pressure chamber substrate 120 include silicon. As illustrated in FIG. 3, as a flow path forming substrate, a communication plate 110 is provided between the pressure chamber substrate 120 and the nozzle plates 10. When the communication plate 110 partitions a space between the nozzle plate 10 and pressure chamber substrate 120, an ink supply room 40 (a liquid storage portion), a supply port 126 which communicates with the ink supply room 40, and a pressure chamber 20 which communicates with supply port 126 are formed. That is, the ink supply room 40, the supply port 126, and the pressure chamber 20 are partitioned off by the nozzle plate 10, the communication plate 110, pressure chamber substrate 120, and the diaphragm 30.

The communication plate 110 includes a communication hole 127 which communicates with the nozzle hole 12 from the pressure chamber 20. A discharge port 128 of the ink is formed at an end portion of the communication hole 127 formed on the surface on which the communication plate 110 is in contact with the nozzle plate 10. The discharge port 128 communicates with the nozzle hole 12 formed on the nozzle plate 10.

The diaphragm 30 is provided by being in contact with the pressure chamber substrate 120, and the piezoelectric element 32 is formed by being in contact with the diaphragm 30. The piezoelectric element 32 is electrically connected to a piezoelectric element driving circuit (not shown), and can operates (vibrating and deforming) based on a signal of the piezoelectric element driving circuit. The diaphragm 30 is deformed by the operation of the piezoelectric element 32, and changes the volume per pressure chamber 20 such that the internal pressure of the pressure chamber 20 can be changed. The piezoelectric element 32 is not particularly limited, and examples thereof include an element (an electromechanical conversion element) which belongs to a type causing deformation due to the application of voltages. As described above, in the embodiment, a piezoelectric actuator 34 is configured to include the piezoelectric element 32 and the diaphragm 30.

Note that, in the example, the pressure chamber 20 is partitioned by the communication plate 110, the pressure chamber substrate 120, and the diaphragm 30; however, the pressure chamber 20 can be formed by appropriate members as long as the volume can be changed by vibrating the diaphragm 30, and thus the number of the members, and the shape and material thereof are arbitrary. Further, the diaphragm 30 may be integrally formed with an electrode (for example, formed of Pt or the like) forming the piezoelectric element 32.

In the head 100 of the embodiment, the interval between the nozzle holes 12 is equal to or smaller than 127 μm, and thus the piezoelectric element 32 preferably has a configuration in which a piezoelectric material is disposed between two electrodes. That is, the piezoelectric actuator 34 preferably has a thin film form as a whole, in which an electrode on one side, a layer of the piezoelectric material (for example, lead zirconate titanate (PZT)), and an electrode on the other side are sequentially laminated on the diaphragm 30.

A material of the diaphragm 30 is not particularly limited as well, and examples thereof include silicon oxide ($SiO_2$), silicon nitride (SiN), silicon oxynitride (SiON), zirconium oxide ($ZrO_2$), titanium oxide ($TiO_2$), and silicon carbide (SiC), and a laminate of a layer made therefrom. As the material of the diaphragm 30, a material having the Young's modulus which is equal to or lower than 250 Gpa is preferable from the viewpoint that the displacement can be increased and damage hardly occurs, and a material formed of $ZrO_2$ (150 GPa), $SiO_2$ (75 GPa), Si (130 GPa), SUS (199 GPa), and Cr (248 GPa) is more preferable (the value in parentheses is the Young's modulus). Further, in a case where the electrode of the piezoelectric element 32 is formed of Pt, and is integrally laminated with the diaphragm 30, each of the Young's modulus of Pt and $ZrO_2$ is 168 GPa and 150 GPa, and total value of the Young's modulus of Pt and $ZrO_2$ is equal to or lower than 250 GPa. For this reason, such a configuration is preferably employed.

Note that, in the specification, the Young's modulus means Young's modulus obtained by the measurement through a static test (JIS G0567J or the like) (a mechanical test), for example, No. II-6 test pieces are used for the measurement.

Further, the head 100 is set as a member forming a portion of an ink flow path, and is provided with a compliance sheet 140 and a cover 150 for accommodating the piezoelectric element 32. A supply port 126 which communicates with the ink supply room 40 between the compliance sheet 140 and the communication plate 110 is formed. In addition, the compliance sheet 140 which is a flexible elastic film has a function as a damper for discharging and distributing the ink, and a function of suppressing damage of the head 100 by being deformed in a case where the ink volume expands.

The compliance sheet 140 is not particularly limited as long as it is an elastic membrane, and examples thereof include a polymer film, a thinned metal, a glass fiber, and a carbon fiber. A material of the polymer film is not particularly limited, and examples thereof include polyimide, nylon, polyolefin, and polyphenylene sulfide. Among them, it is preferably formed of the polyphenylene sulfide. Further, examples of the metal include materials containing iron and aluminum.

The thickness of the compliance sheet 140 is not particularly limited, and is preferably equal to or less than 50 μm, is more preferably equal to or less than 20 μm, and is still more preferably in a range of 1 μm to 10 μm. When the compliance sheet 140 is excessively thin, the vibration at the time of ink discharge becomes larger, and a large amount of residual vibration may occur.

In the embodiment, the ink supply room 40, the supply port 126, the pressure chamber 20, and the communication hole 127 are separately described; however, both are liquid flow paths, and design of the flow paths is not limited as long as the pressure chambers 20 are formed. For example, in the illustrated example, the supply port 126 has a shape in which a part of the flow path is narrowed, but such expansion or contraction of the flow path can be arbitrarily formed according to the design, and is not necessarily an essential configuration.

The pressure chamber 20 configured as described above is a space which is partitioned by the communication plate 110, the pressure chamber substrate 120, and the diaphragm 30, which means a space which does not include the supply port 126, the communication hole 127, the discharge port 128, and the nozzle hole 12. In other words, in a case where a space facing the portions (portions in which the wall of the pressure chamber 20 is deformed or heated) such as the diaphragm 30, the pressure chamber substrate 120, and the communication plate 110 in which the pressure is applied to ink, and a space which is adjacent to the aforementioned space, and has the same sectional area of the cross section as that of the aforementioned space with respect to the direction in which the ink moves are assumed to be the pressure chamber 20, the volume of the pressure chamber 20 means the volume of these spaces. As such, the pressure chamber 20 is defined as a space of which the volume changes by the displacement of the diaphragm 30 and a space which does not include a narrowed flow path communicating with the space.

As described above, the communication hole 127 communicates with the nozzle hole 12 from the pressure chamber 20. In the invention, a portion in which the ink flows to the nozzle side from the pressure chamber to a portion of the nozzle, that is, in the example of FIG. 3, the communication hole 127, the nozzle hole 12, and all portions connected to the communication hole and the nozzle hole are defined as a connecting portion 132. Accordingly, in the example in FIG. 3, the connecting portion 132 is provided so as to pass through the communication plate 110 in parallel with the thickness direction, and thus the distance of the connecting portion 132 is equal to the sum of length d1 of the communication plate 110 in the thickness direction and length d2 of the nozzle plate 10 in the thickness direction.

In the embodiment, for example, the sum of the length d1 of the communication plate 110 in the thickness direction and the length d2 of the nozzle plate 10 in the thickness direction, that is, d1+d2 is preferably equal to or greater than 500 μm. As such, when a configuration in which the distance of the connecting portion 132 is long is employed, it is possible to prevent the drying of the ink from progressing from the nozzle surface 13. With this, even in a case where the resin content in the ink is set to be increased so as to improve the wash fastness of the ink coating film, the intermittent properties are not damaged. In addition, even in a case where the content of resin in the ink is increased, contamination of the nozzle surface 13 and strike-through of the ink due to the increase in mist at the time of ink discharge are prevented, and thereby as the ink, it is possible to provide an ink jet printed material excellent in the coloring developing properties.

Note that, in the example illustrated in FIG. 3, the nozzle plate 10 and the communication plate 110 are laminated, and the nozzle hole 12 and the communication hole 127 are formed of different members; however, the nozzle plate and the communication plate may be formed of the same member. Even in a case where the nozzle plate and the communication plate are formed of the same member, the connecting portion 132 is a portion in a range of the portion in which the ink flows to the nozzle side from the pressure chamber to the portion of the nozzle. Even in this case, it is possible to prevent the drying of the ink from progressing from the nozzle surface in a case where the distance of the connecting portion is equal to or greater than 500 μm.

The distance of the connecting portion 132 is preferably in a range of 500 μm to 3000 μm, is more preferably in a range of 700 μm to 2500 μm, and is still more preferably in a range of 900 μm to 1500 μm. Note that, even in a case where the communication hole extends obliquely with respect to the nozzle plate 10, the length of the communication hole is along the communication hole, and in this case, the length of the communication hole is longer than the length d1 of the communication plate 110 in the thickness direction. That is, the shortest distance from the boundary between the pressure chamber 20 and the communication hole through the communication hole to the nozzle hole 12 corresponds to the length of the communication hole, and the distance of the connecting portion corresponds to the length obtained by adding the lengths of the nozzle hole 12 and all portion which are connected to the nozzle hole to the length of the communication hole.

The sum of the volume per pressure chamber and the volume of the connecting portion, that is, in the embodiment, the sum of the volumes of the pressure chamber 20, the communication hole 127, and the nozzle hole 12 is preferably in a range of 4200 pl to 6200 pl, and is more preferably in a range of 4500 pl to 5500 pl. In this case, it is possible to prevent the drying of the ink from further progressing from the nozzle surface 13.

In this case, the volume per pressure chamber 20 is preferably equal to or less than 3700 pl, is more preferably equal to or less than 3500 pl, is still more preferably equal to or less than 3300 pl, and is still more preferably equal to or less than 3000 pl. The lower limit of the volume per pressure chamber 20 is preferably equal to or greater than 1500 pl, and is more preferably equal to or greater than 2000 pl. When the volume per pressure chamber is equal to or less than 3700 pl, it is possible to sufficiently secure the volume of the communication hole 127, and thus it is possible to effectively prevent the drying of the ink from further progressing from the nozzle surface 13.

The ink supply room 40 can temporarily store the ink supplied from the outside (for example, an ink cartridge) via a though hole 129 provided in the diaphragm 30. The ink in the ink supply room 40 can be supplied to the pressure chamber 20 via the supply port 126. The volume of the pressure chamber 20 is changed due to the deformation of the diaphragm 30. When the pressure chamber 20 communicates with the nozzle hole 12 via the communication hole 127, and the volume per pressure chamber 20 is changed, the ink can be discharged from the nozzle hole 12, or introduced to the pressure chamber 20 from the ink supply room 40.

Here, a nozzle diameter of the nozzle hole 12 is preferably in a range of 5 μm to 100 μm, is more preferably in a range of 10 μm to 60 μm, is still more preferably in a range of 10 μm to μm from the viewpoint of improving image quality and reducing intermittency and mist.

As illustrated in FIG. 2, it is possible to store the nozzle plate 10, pressure chamber substrate 120, and the piezoelectric element 32 in the case 130. Examples of a material of the case 130 include a resin and metal. The case 130 may have a function of separating the piezoelectric element 32 from the external environment. In addition, the inert gas or the like may be sealed in the case 130, and the pressure in the case 130 may be reduced. With this, it is possible to suppress the deterioration of the piezoelectric material.

The cover 150 is configured as a separated member from the case 130. The cover 150 is provided to be in contact with the diaphragm 30, forms a space for accommodating the piezoelectric element 32, and stores the piezoelectric element 32 in the aforementioned space. A material of the cover 150 is the same as that of the above-described case 130. The case 130 is set as a cover for covering the piezoelectric element 32; however, the cover 150 may have a function of separating the piezoelectric element 32 from the external environment, the inert gas or the like may be sealed in a space formed by the cover 150, and the pressure in the space may be reduced. With this, it is possible to suppress the deterioration of the piezoelectric material of the piezoelectric element 32. In this case, the case 130 may function as a support of the head 100.

In a case where the head 100 as described above is mount on the printer 200, the nozzle plate 10 is disposed so as to face fabric P, and the nozzle plate 10 is directly in contact with atmosphere (outside air). In addition, the head 100 of the embodiment includes the case 130 and the cover 150, and thus it has a structure in which the piezoelectric element 32 and the diaphragm 30 are not substantially in contact with the outside air.

In the embodiment, the head 100 satisfies the following Expression (1).

$$0.13 \leq \{(\text{discharge amount per droplet ejection})/(\text{volume of ink pressure chamber})\} \times 100 \quad (1)$$

When the head 100 satisfies Expression (1), it is possible to provide an image forming method in which the occurrence of a foreign matter derived from the diketopyrrolopyrrole pigment having high hydrophobicity described below is suppressed, and discharge errors are decreased so as to realize excellent discharge stability. In addition, when the head satisfying Expression (1) is used, it is possible to realize the excellent thin line expression.

Note that, in the above-described Expression (1), a discharge amount per droplet ejection is a volumetric flow rate, and the discharge amount per droplet ejection approximately corresponds to the volume decrease amount (exclusion volume) of the ink pressure chamber when one droplet is discharged by displacement of the diaphragm. In addition, in the above-described Expression (1), the one droplet ejection refers to one liquid droplet when the liquid is discharged from the head 100, and does not include a collection of a plurality of liquid droplets before landing on the surface of the recording medium.

Further, in the above-described Expression (1), the volume of the ink pressure chamber is a total volume of a space facing the portions in which the pressure is applied to ink, and a space, which is adjacent to the aforementioned space, in the direction in which the ink moves toward the nozzle. In other words, the volume of the ink pressure chamber is the total volume of the space in which the volume is changed due to the displacement of the diaphragm, and the space including a narrowed flow path communicating the aforementioned space. Accordingly, in the embodiment, the volume of the ink pressure chamber is the total volume of the volume per pressure chamber, and the volume of the connecting portion, that is, the total volume of the pressure chamber 20, the communication hole 127, and the nozzle hole 12 is the volume of the ink pressure chamber.

Further, an apparatus including the piezo ink jet head preferably satisfies the following expression (2).

$$0.13 \leq \{(\text{discharge amount per droplet ejection})/(\text{volume of ink pressure chamber})\} \times 100 \leq 0.18 \quad (2)$$

In the embodiment, when the above-described Expression (2) is satisfied, it is possible to provide an image forming method in which the occurrence of cavitation is more preferably suppressed, and the discharge errors are decreased so as to realize excellent discharge stability. Note that, in the above-described Expression (2), definitions of the discharge amount per droplet ejection and the volume of ink pressure chamber are the same as those in Expression (1).

In this regard, in the image forming method according to the embodiment, the ink jet apparatus performs image formation by using the ink compositions described below. The image formation is preferably performed through ink jet printing.

1.2. Ink Compositions

The ink compositions used in the image forming method according to one embodiment of the invention contain a diketopyrrolopyrrole pigment and a solvent having a SP value of equal to or lower than 13.

Hereinafter, the components contained in the ink composition (hereinafter, also simply referred to as "ink") used for the image forming method according to the embodiment will be described in detail.

1.2.1. Pigment

The ink used for the image method according to the embodiment contains a diketopyrrolopyrrole pigment as a pigment. The diketopyrrolopyrrole pigment is a highly hydrophobic pigment, and the dispersion stability thereof tends to deteriorated; however, it is possible to obtain an image in which the color developing properties and abrasion resistance which are particularly required in the printing field are secured.

Examples of the diketopyrrolopyrrole pigment include a red-based pigment and an orange-based pigment.

Examples of a red-based pigment include organic pigments such as C.I. Pigment Red 254, C.I. Pigment Red 255, C.I. Pigment Red 264, C.I. Pigment Red 270, and C.I. Pigment Red 272. Among them, from the viewpoint of obtaining recorded material with more excellent color density, red-based organic pigments such as C.I. Pigment Red 254, C.I. Pigment Red 255, and C.I. Pigment Red 264 are preferable, C.I. Pigment Red 255 and C.I. Pigment Red 254 are more preferable, and C.I. Pigment Red 254 is still more preferable.

The C.I. Pigment Red 254 which is a diketopyrrolopyrrole-based pigment of CAS registration No. 84632-65-5 has a chemical formula of $C_{18}H_{10}Cl_2N_2O_2$, and the chemical name thereof is 3,6-bis(4-chlorophenyl)-2,5-dihydropyrrolo [3,4-c] pyrrole-1,4-dione. As the C.I. Pigment Red 254, commercially available products can be used, and examples thereof include "DPP Red BP P" prepared by Ciba-Geigy Japan Limited, and "Pigment Red 254" prepared by Tokyo Chemical Industry Co., Ltd.

The C.I. Pigment Red 255 which is a diketopyrrolopyrrole-based pigment of CAS registration No. 54660-00-3 has a chemical formula of $C_{18}H_{12}N_2O_2$, and the chemical name thereof is 3,6-diphenyl-2,5-dihydropyrrolo [3,4-c] pyrrole-1,4-dione. As the C.I. Pigment Red 255, commercially available products can be used, and examples thereof include "Pigment Red 255" prepared by Tokyo Chemical Industry Co., Ltd., and "DPP Scarlet EK" prepared by Ciba-Geigy Japan Limited.

The C.I. Pigment Red 264 which is a diketopyrrolopyrrole-based pigment of CAS registration No. 88949-33-1 has a chemical formula of $C_{30}H_{20}N_2O_2$, and the chemical name thereof is 3,6-bis(4-biphenylyl)pyrrolo[3,4-c]pyrrole-1,4-dione. As the C.I. Pigment Red 264, commercially available products can be used, and examples thereof include "Irgazin DPP Rubine FTX", and "Microlen DPP Rubine TR" prepared by Ciba-Geigy Japan Limited.

Examples of an orange-based pigment include C.I. pigment orange 71, C.I. pigment orange 73, and C.I. pigment orange 81.

The C.I. pigment orange 71 which is a diketopyrrolopyrrole-based pigment of CAS registration No. 71832-85-4 has a chemical formula of $C_{20}H_{10}N_4O_2$, and the chemical name thereof is 3,6-bis(3-cyanophenyl)-2,5-dihydro-pyrrolo[3,4-c]pyrrole-1,4-dione. As the C.I. pigment orange 71, commercially available products can be used, and examples thereof include "DPP Orange TA" prepared by Ciba-Geigy Japan Limited, "Cromophtal Orange" prepared by Clariant, and "Orange TRP" prepared by BASF.

The C.I. pigment orange 73 which is a diketopyrrolopyrrole-based pigment of CAS registration No. 84632-59-7 has a chemical formula of $C_{26}H_{28}N_2O_2$, and the chemical name thereof is 3,6-bis[4-(1,1-dimethyl ethyl) phenyl]-2,5-dihydro-pyrrolo[3,4-c]pyrrole-1,4-dione. As the C.I. Pigment Oranges 73 and 81, commercially available products can be used.

In the ink used for the method of forming an image according to the embodiment, the solid concentration of the diketopyrrolopyrrole pigment is preferably in a range of 3% by mass to 10% by mass with respect to the total mass of the ink jet ink composition. When the solid concentration of the diketopyrrolopyrrole pigment is in a range of 3% by mass to 10% by mass, a solvent described below and the head are used in combination so as to suppress the occurrence of a foreign matter derived from the pigment, and decrease the discharge error, thereby obtaining an image forming method which is excellent in the discharge stability. Further, it is possible to obtain an image in which the color developing properties and the abrasion resistance which are required in the printing field are secured. Note that, the solid concentration of the diketopyrrolopyrrole pigment is more preferably in a range of 3.5% by mass to 8% by mass, and is still more preferably in a range of 5% by mass to 7% by mass.

In addition, the ink used in the embodiment may contain pigments other than the diketopyrrolopyrrole pigments. The pigments other than the diketopyrrolopyrrole pigments are not particularly limited, and for example, both an organic pigment and an inorganic pigment can be used, and pigments having various colors can be used.

Examples of the pigments other than the diketopyrrolopyrrole pigment include organic pigments (Brilliant Carmine 6B, Lake Red C, Watching Red, Disazo Yellow, Hansa Yellow, Phthalocyanine Blue, Phthalocyanine Green, Alkali Blue, Aniline Black, and the like) such as an azo-based pigment, a phthalocyanine-based pigment, a condensed poycyclic-based pigment, a nitro-based pigment, a nitroso-based pigment, a hollow resin particle and a polymer particle; metals such as cobalt, iron, chromium, copper, zinc, lead, titanium, vanadium, manganese, and nickel; metal oxides and sulfides such as titanium oxide, zinc oxide, antimony oxide, zinc sulfide, and zirconium oxide; carbon blacks such as furnace carbon black, lamp black, acetylene black, and channel black (C.I. Pigment Black 7); and inorganic pigments such as loess, ultramarine, and Prussian blue.

More specifically, examples of the carbon black which can be used as a black-based pigment include MCF88, No. 2300, 2200B, 900, 33, 40, 45, 52, MA7, 8, 100 and the like (trade names, which are prepared by Mitsubishi Chemical Corporation); RAVEN 5750, 5250, 5000, 3500, 1255, 700, and the like (trade names, which are prepared by Columbia Carbon); REGAL 400R, 330R, 660R, MOGUL L, MONARCH 700, 800, 880, 900, 1000, 1100, 1300, 1400, and the like (trade names, which are prepared by Cabot Corporation); and COLOR BLACK FW1, FW2, FW2V, FW18, FW200, 5150, 5160, 5170, PRINTEX 35, U, V, 140U, SPECIAL BLACK 6, 5, 4A, 4, and the like (trade names, which are prepared by Evonik Industries).

Examples of a white-based pigment include C.I. Pigment Whites 1 (basic lead carbonate), 4 (zinc oxide), 5 (mixture of zinc sulfide and barium sulfate), 6 (Titanium oxide), 6:1 (titanium oxide containing other metal oxides), (zinc sulfide), 18 (calcium carbonate), 19 (clay), 20 (mica titanium), 21 (barium sulfate), 22 (natural barium sulfate), 23 (gross white), 24 (alumina white), 25 (gypsum), (magnesium oxide.silicon oxide), 27 (silica), and 28 (anhydrous calcium silicate).

Examples of a yellow-based pigment include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a magenta-based pigment include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57: 1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment violet 19, 23, 32, 33, 36, 38, 43, and 50.

Examples of a cyan-based pigment include C.I. Pigment Blues 1, 2, 3, 15, 15:1, 15:2, 15:3, 15:34, 15:4, 16, 18, 22, 25, 60, 65, and 66.

Examples of pigments other than the magenta, cyan, and yellow pigments include C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

Pigments other than the above-described diketopyrrolopyrrole pigment may be used alone or two or more types thereof may be used in combination.

The contents of the pigments other than the diketopyrrolopyrrole pigment contained in the ink used in the embodiment are different depending on the types of pigments to be used; however, from the viewpoint that the excellent color developing properties are secured without damaging the dispersibility of the entire pigments, the total sum of the aforementioned pigment and the diketopyrrolopyrrole pigment is preferably in a range of 1% by mass to 30% by mass, is more preferably in a range of 3% by mass to 15% by mass, and still more preferably in a range of 5% by mass to 10% by mass, with respect to the total mass of the ink.

From the viewpoint of improving the dispersibility in the ink, the pigment may be a surface-treated pigment or pigment using a dispersant or the like.

The surface-treated pigment is a pigment in which a hydrophilic group such as a carboxyl group and a sulfonic acid group is directly or indirectly bonded to a pigment surface through a physical treatment or a chemical treatment so as to be dispersible in an aqueous solvent (hereinafter, also referred to as a "self-dispersing pigment").

In addition, a pigment using a dispersant means a pigment which is dispersed by using a surfactant or a resin (hereinafter, also referred to as a "polymer dispersed pigment"), and as the surfactant and the resin, well-known materials can be used. In addition, a pigment coated with the resin also belongs to the "polymer dispersed pigment". The pigment coated with the resin can be obtained through an acid precipitation method, a phase inversion emulsification method, a mini-emulsion polymerization method, or the like.

1.2.2. Resin

The ink used in the embodiment preferably contains a resin. When the ink contains the resin, it is possible to improve the adhesion between the ink and fabric, and thus the abrasion resistance of an image to be recorded can be improved.

The ink used in the embodiment can be suitably used for recording with respect to the fabric. Here, the fabric has stretchable properties, and thus the image to be recorded, that is, an ink film which is formed by ink is preferably stretchable (easily stretched). In other words, when the ink film has the elongation that can stretch and contract following the stretch and contraction of the fabric, it is possible to prevent the fracture and cracking of the ink film, and thus the wash or friction fastness can be secured. From this viewpoint, the film elongation of the resin contained in the ink used in the embodiment is preferably in a range of 400% to 1200%, is more preferably in a range of 500% to 1200%, is still more preferably in a range of 600% to 1200%, and is particularly preferably in a range of 700% to 1200%. When the film elongation of the resin is within the above-described range particularly without being less than the lower limit, it is possible to form an image having excellent following up properties with respect to the stretch and contraction of the fabric. In addition, when the film elongation of the resin is within the above-described range particularly without being greater than the upper limit, the viscosity of the ink film is maintained in a proper range, and an anchor effect on fabric can be prevented from being deteriorated, and thus it is possible to form an image which is excellent in the wash or friction fastness (abrasion resistance) while suppressing the deterioration of the fixing properties.

The film elongation of the resin is measured by using the following method. First, a polytetrafluoroethylene sheet is coated with a resin such that the thickness of the dried film is 500 μm, the coated film is dried at normal temperature (20° C.) and normal pressure (65% RH) for 15 hours, further dried at 80° C. for six hours and at 120° C. for 20 minutes, and then is detached from the sheet so as to make a resin film. Then, the film elongation of the obtained resin film is measured under the conditions of a measurement temperature of 20° C. and a measurement rate of 200 mm/min, by using a tensile tester. The measurement of the film elongation is performed by measuring the length obtained by elongating the resin film until the resin film is fractured, and the ratio is indicated by percentage as the film elongation. Note that, as a tensile tester, for example, TENSILON UNIVERSAL TESTER RTC-1225A (trade name, manufactured by Orientec Co., Ltd.) or a similar tester can be used.

In addition, from the viewpoint that the fracture and cracking of the ink film can be prevented, and the washing and friction fastness can be secured, the resin has a glass transition point (Tg) which is preferably equal to or lower than 0° C., is more preferably equal to or lower than −10° C. In addition, the lower limit of the glass transition point (Tg) is preferably equal to or higher than −80° C. Further, from the viewpoint that the resin contained in the first ink can prevent the fracture and the cracking of the ink film, and secure the wash or friction fastness, a minimum film-forming temperature (MFT) is preferably equal to or lower than 0° C., is more preferably equal to or lower than −10° C. Further, the lower limit of the minimum film-forming temperature is preferably equal to or higher than −80° C.

From the viewpoint that it is possible to improve the abrasion resistance and the adhesiveness of the film, and the storage stability of ink, the resin is preferably emulsion. The resin contained in the ink according to the embodiment may be a self-emulsifying type to which a hydrophilic component necessary for stably dispersing the ink in water is introduced, or may be water dispersible by using an external emulsifier. A self-emulsifying type dispersion (a self-emulsifying type emulsion) without containing emulsifier does not inhibit the reaction with the polyvalent metal compound contained in the pretreatment agent described later, and thus is preferably used.

Examples of the resin include an acrylic-based resin, a styrene acrylic-based resin, a fluorene-based resin, a urethane-based resin, a polyolefin-based resin, a rosin modified resin, a terpene-based resin, a polyester-based resin, a polyamide-based resin, an epoxy-based resin, a vinyl chloride-based resin, a vinyl chloride-acetic acid vinyl copolymer, and an ethylene vinyl acetate-based resin. These resins may be used alone or two or more types thereof may be used in combination. Among them, from the viewpoint that the degree of freedom of design is high, and therefore, desired film properties (the above-described film elongation) are easily obtained, at least one selected from the urethane-based resin and the acrylic-based resin is preferably used, and the urethane-based resin is more preferably used.

The urethane-based resin is not particularly limited as long as it has a urethane skeleton and the water dispersibility, and examples thereof include commercially available products such as SUPERFLEX 460, 460s, and 840 (trade name, prepared by DKS Co. Ltd.), RESAMINE D-1060, D-2020, D-4080, D-4200, D-6300, and D-6455 (trade names, prepared by Dainichiseika Color & Chemicals Mfg. Co., Ltd.), TAKELAC WS-6021, W-512-A-6 (trade names, prepared by Mitsui Chemicals & SKC Polyurethanes), and SUNCURE 2710 (trade name, prepared by LUBRIZOL).

In addition, from the viewpoint of the storage stability of ink, and the improvement of the reactivity in a case of containing a polyvalent metal compound in a pretreatment agent described below, the urethane-based resin is preferably an anionic urethane-based resin having an anionic functional group such as a carboxy group, a sulfo group, and a hydroxy group. Among the above-described commercially available products, examples of the anionic urethane-based resin include SUPERFLEX 460, 460s, 840 (trade name, prepared by DKS Co. Ltd.) and TAKELAC WS-6021, W-512-A-6 (trade names, prepared by Mitsui Chemicals & SKC Polyurethanes).

Examples of the urethane-based resin other than the urethane bond include a polyether type urethane resin containing an ether bond as a main chain, a polyester type urethane resin containing an ester bond as a main chain, and a polycarbonate type urethane resin containing a carbonate bond as a main chain. A plurality of types of these urethane resins can be used in combination.

Examples of the acrylic-based resin include a polymer of acrylic-based monomers such as acrylic acid and acrylate ester, and a copolymer of an acrylic-based monomer and other monomers, and examples of other monomers include a vinyl-based monomer such as styrene. As the acrylic-based resin, commercially available products can be used, and examples thereof include MOWINYL 702, 7502, 7525, and 7320 (prepared by Nippon Synthetic Chemical Industry Co., Ltd).

The content of the resin is, in terms of the solid content, preferably in a range of 3% by mass to 20% by mass, is more preferably in a range of 5% by mass to 15% by mass, and is still more preferably in a range of 7% by mass to 10% by mass, with respect to the total mass of the ink. When the content of the resin in the ink is within the above-described range particularly without being less than the lower limit, it is possible to sufficiently exhibit the effect of improving the ink fixing properties by the resin, and thus the abrasion resistance of the image to be recorded is improved, and the obtained washing fastness of the ink coating film is improved. In addition, when the content of the resin in the ink is not greater than the upper limit, it is possible to suppress the occurrence of aggregates due to the resin, and thus the ink coating film has the excellent storage stability and the discharge stability of the ink.

In addition, from the view point of securing the wash fastness of the obtained ink coating film, the ratio of the total content of the organic solvents to the total content of the resins in terms of the solid content is equal to or greater than 0.3, is preferably in a range of 0.4 to 3, and is more preferably in a range of 0.5 to 2.7. The upper limit is preferably equal to or lower than 2.5, is more preferably equal to or lower than 2, is still more preferably equal to or lower than 1.5, is still more preferably equal to or lower than 1.2, and is still more preferably equal to or lower than 0.8. In addition, from the viewpoint that the wash fastness of the obtained ink coating film can be secured, a total of the total content of the solid content of resin and the total content of the organic solvent is preferably equal to or less than 37% by mass, is preferably in a range of 15% by mass to 35% by mass, and is more preferably in a range of 18% by mass to 33% by mass, with respect to the ink composition. In addition, the lower limit thereof is more preferably equal to or greater than 22% by mass, is still more preferably equal to or greater than 27% by mass, and is most preferably equal to or greater than 30% by mass.

1.2.3. Flocculating Agent

In a case where an image is recorded on a non-white colored fabric, in order to improve the image visibility on the non-white colored fabric, a white ink containing the white-based pigment such as titanium oxide is used. However, the non-white colored fabric has a tendency that the color developing properties in a case where the ink permeates into fabric and the hiding properties of the fabric are greatly deteriorated, and the color developing properties of the image to be recorded and the hiding properties of the fabric are not sufficiently obtained. For this reason, from the viewpoint of improving the color developing properties of the image obtained by the ink used for forming the image on the non-white colored fabric, and the hiding properties of the fabric, it is preferable to contain the flocculating agent that agglomerates or thickens the ink composition.

As the flocculating agent, a polyvalent metal compound such as calcium chloride can be used. When the flocculating agent reacts with the resin contained in ink or the components of the pigment, and the components of the ink form an aggregate, it is possible to improve the color developing properties of the image to be recorded, and the hiding properties of the fabric.

1.2.4. Solvent

The ink used in the embodiment contains a solvent having a SP value of equal to or lower than 13. The diketopyrrolopyrrole pigment has high hydrophobicity, and thus when the solvent having the SP value of equal to or lower than 13 is used as a solvent, the dispersibility in the ink of the diketopyrrolopyrrole pigment is improved and the occurrence of a foreign matter derived from the diketopyrrolopyrrole pigment is suppressed. Further, when the solvent having the SP value of equal to or lower than 13 is used as a solvent, the ink easily follows the movement of the head, and thus it is possible to realize the excellent discharge stability by decreasing the discharge errors.

In the specification, the "SP value" means a compatibilization parameter, and can be referred to as a solubility parameter. It means a value calculated by using Hansen's expression as described below. The solubility parameter of Hansen is indicated as a three-dimensional space by dividing the solubility parameter introduced by Hildebrand into three components of a dispersion term $\delta d$, a polar term $\delta p$, and a hydrogen bonding term $\delta h$. In the specification, the SP value is indicated by $\delta[(cal/cm^3)^{0.5}]$, and the value calculated by using the following expression formula is used.

$$\delta[(cal/cm^3)^{0.5}]]=(\delta d^2+\delta p^2+\delta h^2)^{0.5}$$

Note that, the above-described dispersion term $\delta d$, polar term $\delta p$, and hydrogen bonding term $\delta h$ are greatly required by Hansen and its successors to research, and are described in for example, VII-698 to 711 of Polymer Handbook (fourth edition). In addition, the solubility parameter of Hansen relating to many solvents and resins has been investigated, and the solubility parameters thereof are described in, for example, Industrial Solvents Handbook (written by Wesley L. Archer).

The solvent contained in the ink used in the embodiment is not particularly limited as long as the SP value is equal to or lower than 13; however, the SP value of the solvent is preferably equal to or greater than 9. When the SP value of the solvent is in a range of 9 to 13, the dispersibility in the ink of the diketopyrrolopyrrole pigment is stable, the occurrence of a foreign matter derived from the diketopyrrolopyrrole pigment is suppressed, and the discharge errors are decreased, thereby realizing the excellent discharge stability. The SP value of the solvent is preferably in a range of 9.3 to 12, and is more preferably in a range of 9.5 to 11.5 in terms of the dispersion stability. Note that, when the SP value of the solvent is lower than 9, while the ink easily follows the movement of the head, the balance with the dispersibility of the ink absorbed by a plastic base material such as an ink pack containing ink is likely to be collapsed, and thereby the foreign matters may occur.

Examples of the solvent having the SP value of equal to or lower than 13 include n-propyl alcohol (SP value of 11.8), ethyl propyl ether (SP value of 8.8), 1, 2-hexanediol (SP value of 12.1), dipropylene glycol (SP value of 12.9), ethanol (SP value of 11.8), 2-ethyl-1,3-exandiol (SP value of 11.6), tetraethylene glycol (SP value of 12.6), 2-propanol (SP value of 12.7), ethylene glycol monomethyl ether (SP value of 11.4), ethylene glycol monoisopropyl ether (SP value of 9.2), ethylene glycol monobutyl ether (SP value of 9.8), diethylene glycol monomethyl ether (SP value of 11.6), diethylene glycol monobutyl ether (SP value of 9.5), triethylene glycol monobutyl ether (SP value of 10.0), propylene glycol monomethyl ether (SP value of 10.4), propylene glycol n-propyl ether (SP value of 9.8), propylene glycol n-butyl ether (SP value of 9.7), dipropylene glycol monomethyl ether (SP value of 9.6), dipropylene glycol monoethyl ether (SP value of 10.9), dipropylene glycol n-propyl ether (SP value of 9.5), dipropylene glycol n-butyl ether (SP value of 9.4), diethylene glycol dimethyl ether (SP value of 9.4), diethylene glycol methyl butyl ether (SP value of 9.3), triethylene glycol monomethyl ether (SP value of 10.5), propylene glycol monophenyl ether (SP value of 9.4), tripropylene glycol monomethyl ether (SP value of 9.1), and tripropylene glycol n-butyl ether (SP value of 9.3). Among them, alkylene glycol monoalkyl ether such as ethylene glycol monomethyl ether, ethylene glycol monoisopropyl ether, ethylene glycol monobutyl ether, diethylene glycol monomethyl ether, diethylene glycol monobutyl ether, and triethylene glycol monobutyl ether is preferable, ethylene glycol monomethyl ether, and triethylene glycol monobutyl ether are more preferable, and triethylene glycol monobutyl ether is particularly preferable.

The solvent having the SP value of equal to or lower than 13 may be used alone, and two or more types thereof may be used in combination. The content of the solvent is, for example, preferably in a range of 0.05% by mass to 15% by mass, is more preferably in a range of 0.1% by mass to 10% by mass, and is still more preferably in a range of 1% by mass to 8% by mass, with respect to the total mass of the ink. When the content of the solvent is within the above range, the dispersibility in the ink of the diketopyrrolopyrrole pigment is improved, the occurrence of a foreign matter derived from the diketopyrrolopyrrole pigment is suppressed, and the discharge errors are decreased, thereby realizing the excellent discharge stability.

1.2.5. Other Components

The ink used in the embodiment may contain water, an organic solvent other than the above-described solvents, a surfactant, a pH regulator, and an antiseptic and antifungal agent.

Water

The ink used in the embodiment is preferably a water-based ink composition. In this case, water is a main medium of the ink, and is a component evaporated and scattered by drying. Examples of water include pure water such as ion exchanged water, ultrafiltered water, reverse osmosis water, and distilled water, and water such as ultrapure water obtained by removing ionic impurities as much as possible. In addition, when water sterilized by ultraviolet irradiation or addition of hydrogen peroxide is used, occurrence of mold and bacteria can be prevented when the ink is stored for a long time. The content of water contained in the ink is not particularly limited, and the content thereof can be equal to or greater than 50% by mass, can be preferably in a range of 60% by mass to 95% by mass, and can be more preferably in a range of 70% by mass to 90% by mass, with respect to the total mass of the ink.

Water-soluble Organic Solvent

In the present embodiment, in the ink, conventionally well-known various water-soluble organic solvents can be used in combination with the solvent having the SP value of equal to or lower than 13. Examples of the water-soluble organic solvent preferably used as the solvent in the aforementioned combination use include alcohols (for example, methanol, isopropanol, butanol, isobutanol, secondary butanol, tertiary butanol, pentanol, hexanol, cyclohexanol, and benzyl alcohol), polyhydric alcohols (for example, ethylene glycol, diethylene glycol, triethylene glycol, polyethylene glycol, propylene glycol, polypropylene glycol, butylene glycol, hexanediol, pentanediol, glycerin, hexanetriol, thiodiglycol, 1,3-propanediol, 1,4-butanediol, 1,5-pentanediol, 1,2-pentanediol, and 1,2,6-hexanetriol), amines (for example, ethanolamine, diethanolamine, triethanolamine, N-methyl diethanolamine, N-ethyl diethanolamine, morpholine, N-ethyl morpholine, ethylene diamine, diethylene diamine, triethylene tetramine, tetraethylene pentamine, polyethylene imine, pentamethyl diethylene triamine, and tetramethyl propylene diamine), amides (for example, formamide, N,N-dimethyl formamide, and N,N-dimethyl acetamide), a heterocyclic ring (for example, 2-pyrrolidone, N-methyl-2-pyrrolidone, cyclohexyl pyrrolidone, and 2-oxazolidone), sulfoxides (for example, dimethyl sulfoxide), sulfones (for example, sulfolane), urea, acetonitrile, and acetone. These solvents may be used alone or two or more types thereof may be used in combination.

A boiling point of water-soluble organic solvent is preferably in a range of 140° C. to 280° C., is more preferably in a range of 160° C. to 260° C., and is still more preferably in a range of 180° C. to 240° C. When the boiling point of other solvents is within the above-described range, the intermittent properties tend to be further improved.

In addition, the content of the water-soluble organic solvent is preferably in a range of 5.0 to 25% by mass, and is more preferably in a range of 10 to 20% by mass, with respect to the total content of the ink.

Surfactant

The surfactant has a function of decreasing the surface tension and improving the wettability with the recording medium. Among the surfactants, for example, an acetylene glycol-based surfactant, a silicone-based surfactant, and a fluorine-based surfactant can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, prepared by Air Products and Chemicals. Inc.), ORUFIN B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (trade names, prepared by Nissin Chemical Industry CO., Ltd.), and ACETYLENOL E00, E00P, E40, and E100 (trade names, prepared by Kawaken Fine Chemicals Co., Ltd).

The silicone-based surfactant is not particularly limited, and a polysiloxane-based compound is preferably used. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (trade names, prepared by BYK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, prepared by Shin-Etsu Chemical Co., Ltd).

As the fluorine-based surfactant, a fluorine-modified polymer can be preferably used, and specifically, BYK-340 (prepared by BYK).

pH Adjuster

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium bicarbonate.

Antiseptic and Antifungal Agent

Examples of the antiseptic and antifungal agent include sodium benzoate, sodium pentachlorophenol, sodium 2-pyridinethiol-1-oxide, sodium sorbate, sodium dehydroacetate, and 1,2-dibenzinethiazolin-3-one (PROXEL CRL, PROXEL BND, PROXEL GXL, PROXEL XL-2, and PROXEL TN prepared by Imperial Chemical Industries).

1.2.6. Method of Preparing Ink Composition

The ink used in the embodiment is obtained by mixing the above-described components in an optional order, and then filtrating the mixture as necessary so as to remove impurities. As a mixing method of the respective components, a method of sequentially adding materials to a container including a stirrer such as a mechanical stirrer and a magnetic stirrer, and stirring and mixing the materials is preferably used. As a filtration method, centrifugal filtration, filter filtration, and the like can be performed as necessary.

1.2.7. Physical Properties of Ink Composition

The surface tension of the ink used in the embodiment, at 20° C. is preferably in a range of 20 mN/m to 40 mN/m, and is more preferably in a range of 25 mN/m to 35 mN/m from the viewpoint of balance between image quality and reliability as ink for ink jet. Note that, the surface tension can be measured by confirming the surface tension when the ink is applied to a platinum plate under the environment of 20° C. by using an automatic surface tension meter CBVP-Z (trade name, manufactured by Kyowa Interface Science Co., Ltd).

In addition, from the same viewpoint, the viscosity of the ink according to the embodiment at 20° C. is preferably in a range of 3 mPa·s to 10 mPa·s, and is more preferably in a range of 3 mPa·s to 8 mPa·s. Note that, the viscosity is obtained by measuring the viscosity under the environment of 20° C. by using a viscoelasticity tester MCR-300 (trade name, manufactured by Pysica Co., Ltd).

Next, an image forming method according to the embodiment will be described.

1.3. Image Forming Method

The image forming method according to the embodiment includes a step of causing the above-described ink composition to adhere to the fabric by using the ink jet method. With this, the component such as a pigment contained in the ink is aggregated on the fabric, and thus it is possible to obtain an image having the excellent color developing properties.

Here, when the ink adheres on the fabric by the ink jet method, as described above, the ink is discharged by using the apparatus including the piezo ink jet head which satisfies the following Expression (1).

$$0.13 \leq \{(\text{discharge amount per droplet ejection})/(\text{volume of ink pressure chamber})\} \times 100 \quad (1)$$

In the image forming method according to the embodiment, at the time of applying the ink by the ink jet method, the aforementioned ink is discharged by using the apparatus including the piezo ink jet head which satisfies Expression (1), and thus it is possible to provide an image forming method in which the occurrence of a foreign matter derived from the diketopyrrolopyrrole pigment having high hydrophobicity described below is suppressed, and discharge errors are decreased so as to realize excellent discharge stability. When the piezo ink jet head satisfying Expression (1) is used, it is possible to realize the excellent thin line expression.

Further, it is preferable to satisfy the following Expression (2).

$$0.13 \leq \{(\text{discharge amount per droplet ejection})/(\text{volume of ink pressure chamber})\} \times 100 \leq 0.18 \quad (2)$$

In the image forming method according to the embodiment, when Expression (2) is satisfied, it is possible to provide the image forming method in which the discharge errors are decreased so as to realize excellent discharge stability. In addition, it is possible to realize the excellent thin line expression.

Note that, the value of {(discharge amount per droplet ejection)/(volume of ink pressure chamber)}×100 is preferably in a range of 0.14 to 0.17, and is more preferably in a range of 0.15 to 0.16.

The fabric to which the ink composition adheres is not particularly limited, and examples thereof include woven fabric, knitted fabric, and nonwoven fabric which are made from natural fibers such as silk, cotton, and wool, and synthetic fibers such as nylon, polyester, polypropylene, and rayon.

Note that, in the step, the ink composition is preferably applied to the fabric such that the adhesion amount of the ink composition is in a range of 1.5 mg/cm² to 6 mg/cm², and the ink composition is more preferably applied to the fabric such that the adhesion amount of the ink composition is in a range of 2 mg/cm² to 5 mg/cm². When the adhesion amount of the ink composition is 1.5 mg/cm², high color developing properties and abrasion resistance which are required in the printing field are secured. On the other hand, when the adhesion amount of the ink composition is equal to or less than 6 mg/cm², the drying property of the image to be recorded is improved, and bleeding of the image can be suppressed. In addition, it is also possible to perform the step by heating.

Further, as described above, in a case of using the head in which the distance of the connecting portion from the portion in which the ink flows to the nozzle side from the pressure chamber to the nozzle is equal to or greater than 500 μm, even in a case where the solid content of the resin is increased, the ink on the nozzle surface is prevented from being dried and thus it is possible to obtain the image forming method which is excellent in the intermittent properties, and also it is possible to obtain a recorded material which is excellent in the washing fastness.

2. Examples

Hereinafter, the invention will be described more specifically with reference to Examples and Comparative Examples; however, the invention is not limited to only these Examples. In Examples and Comparative Examples, "parts" and "%" are on a mass basis unless otherwise specified.

2.1. Preparing of Ink Composition

The components indicated in Tables 1 and 2 were mixed, the mixed components were mixed and stirred for two hours by using a magnetic stirrer, and were filtrated by using a membrane filter having a hole diameter of 5 μm so as to obtain ink compositions of Examples and Comparative Examples. Note that, a fixing resin, a surfactant and an additive indicated in Tables 1 and 2 are as follows.

Fixing resin (trade name, "TAKELAC WS-6021", prepared by Mitsui Chemical Co., Ltd.)
Surfactant (trade name, "BYK-306", prepared by BYK)
Additive (trade name, "PROXEL CRL", prepared by ICI)

TABLE 1

| Ink materials | | SP value | Examples | | | | | | | |
|---|---|---|---|---|---|---|---|---|---|---|
| | | | 1 | 2 | 3 | 4 | 5 | 6 | 7 | 8 |
| Diketopyrrolopyrrole pigment | Pigment Red 254 | — | 5 | 5 | 5 | 5 | 5 | 5 | 8 | 3.5 |
| | Pigment Red 255 | — | 0 | 0 | 0 | 0 | 0 | 0 | 0 | 0 |
| Azo pigment | Pigment Red 242 | — | 0 | 0 | 0 | 0 | 0 | 0 | 0 | 0 |
| Fixing resin | | — | 5 | 5 | 5 | 5 | 5 | 5 | 5 | 5 |
| Solvent | Glycerin | 16.7 | 9 | 9 | 9 | 9 | 9 | 9 | 9 | 9 |
| | Triethylene glycol | 13.5 | 4 | 4 | 4 | 4 | 4 | 4 | 4 | 4 |
| | 1,2-hexanediol | 12.1 | 0 | 0 | 0 | 0 | 0 | 4 | 0 | 0 |
| | Ethylene glycol monomethyl ether | 11.4 | 0 | 0 | 0 | 4 | 0 | 0 | 0 | 0 |
| | Triethylene glycol monobutyl ether | 10.0 | 4 | 9 | 0.2 | 0 | 0 | 0 | 4 | 4 |
| | Diethylene glycol methyl-t-butyl ether | 9.3 | 0 | 0 | 0 | 0 | 4 | 0 | 0 | 0 |
| | Ethyl propyl ether | 8.8 | 0 | 0 | 0 | 0 | 0 | 0 | 0 | 0 |
| Others | Surfactant | — | 0.6 | 0.6 | 0.6 | 0.6 | 0.6 | 0.6 | 0.6 | 0.6 |
| | Additive | — | 0.5 | 0.5 | 0.5 | 0.5 | 0.5 | 0.5 | 0.5 | 0.5 |
| Water | | 23.5 | 71.9 | 66.9 | 75.7 | 71.9 | 71.9 | 71.9 | 68.9 | 73.4 |
| Total | | — | 100 | 100 | 100 | 100 | 100 | 100 | 100 | 100 |
| Amount of solvent having Hansen SP value in a range of 9 to 13 | | — | 4 | 9 | 0.2 | 4 | 4 | 4 | 4 | 4 |
| (Discharge amount per droplet ejection)/(volume of ink pressure chamber)} * 100 | | | 0.16 | 0.16 | 0.16 | 0.16 | 0.16 | 0.16 | 0.16 | 0.16 |
| Volume (pl) of ink pressure chamber | | | 4500 | 4500 | 4500 | 4500 | 4500 | 4500 | 4500 | 4500 |
| Color density | | | A | A | A | A | A | A | AA | B |
| Expression of thin line | | | A | A | A | A | A | A | A | A |
| Stability of the foreign matter | | | A | B | A | A | B | A | B | AA |
| Stability of discharge | | | AA | AA | B | AA | AA | A | B | AA |
| Wash fastness | | | A | A | A | A | A | A | A | A |

TABLE 1-continued

|  | Ink materials | SP value | \multicolumn{7}{c|}{Examples} |
|---|---|---|---|---|---|---|---|---|---|
|  |  |  | 9 | 10 | 11 | 12 | 13 | 14 | 15 |
| Diketopyrrolopyrrole pigment | Pigment Red 254 | — | 0 | 5 | 5 | 5 | 5 | 5 | 5 |
|  | Pigment Red 255 | — | 5 | 0 | 0 | 0 | 0 | 0 | 0 |
| Azo pigment | Pigment Red 242 | — | 0 | 0 | 0 | 0 | 0 | 0 | 0 |
| Fixing resin |  | — | 5 | 5 | 5 | 5 | 5 | 5 | 5 |
| Solvent | Glycerin | 16.7 | 9 | 9 | 9 | 9 | 9 | 9 | 9 |
|  | Triethylene glycol | 13.5 | 4 | 4 | 4 | 4 | 4 | 4 | 4 |
|  | 1,2-hexanediol | 12.1 | 0 | 2 | 9 | 0 | 0 | 0 | 0 |
|  | Ethylene glycol monomethyl ether | 11.4 | 0 | 0 | 0 | 0 | 0 | 0 | 0 |
|  | Triethylene glycol monobutyl ether | 10.0 | 4 | 4 | 2 | 0.05 | 11 | 4 | 0 |
|  | Diethylene glycol methyl-t-butyl ether | 9.3 | 0 | 0 | 0 | 0 | 0 | 0 | 0 |
|  | Ethyl propyl ether | 8.8 | 0 | 0 | 0 | 0 | 0 | 0 | 4 |
| Others | Surfactant | — | 0.6 | 0.6 | 0.6 | 0.6 | 0.6 | 0.6 | 0.6 |
|  | Additive | — | 0.5 | 0.5 | 0.5 | 0.5 | 0.5 | 0.5 | 0.5 |
| Water |  | 23.5 | 71.9 | 69.9 | 64.9 | 75.85 | 64.9 | 71.9 | 71.9 |
| Total |  | — | 100 | 100 | 100 | 100 | 100 | 100 | 100 |
| Amount of solvent having Hansen SP value in a range of 9 to 13 |  | — | 4 | 6 | 11 | 0.05 | 11 | 4 | 0 |
| (Discharge amount per droplet ejection)/(volume of ink pressure chamber)} * 100 |  |  | 0.16 | 0.16 | 0.16 | 0.16 | 0.16 | 0.19 | 0.16 |
| Volume (pl) of ink pressure chamber |  |  | 4500 | 4500 | 4500 | 4500 | 4500 | 4500 | 4500 |
| Color density |  |  | A | A | A | A | A | A | A |
| Expression of thin line |  |  | A | A | A | A | A | A | A |
| Stability of the foreign matter |  |  | A | A | B | A | C | A | C |
| Stability of discharge |  |  | AA | AA | AA | C | AA | C | AA |
| Wash fastness |  |  | A | A | A | A | A | A | A |

TABLE 2

|  | Ink materials | SP value | \multicolumn{5}{c|}{Comparative Example} |
|---|---|---|---|---|---|---|---|
|  |  |  | 1 | 2 | 3 | 4 | 5 |
| Diketopyrrolopyrrole pigment | Pigment Red 254 | — | 5 | 0 | 5 | 0 | 0 |
|  | Pigment Red 255 | — | 0 | 0 | 0 | 0 | 0 |
| Azo pigment | Pigment Red 242 | — | 0 | 5 | 0 | 5 | 5 |
| Fixing resin |  | — | 5 | 5 | 5 | 5 | 5 |
| Solvent | Glycerin | 16.7 | 9 | 9 | 9 | 9 | 9 |
|  | Triethylene glycol | 13.5 | 4 | 4 | 4 | 4 | 4 |
|  | 1,2-hexanediol | 12.1 | 0 | 0 | 0 | 0 | 0 |
|  | Ethylene glycol monomethyl ether | 11.4 | 0 | 0 | 0 | 0 | 0 |
|  | Triethylene glycol monobutyl ether | 10.0 | 4 | 4 | 0 | 0.05 | 4 |
|  | Diethylene glycol methyl-t-butyl ether | 9.3 | 0 | 0 | 0 | 0 | 0 |
|  | Ethyl propyl ether | 8.8 | 0 | 0 | 0 | 0 | 0 |
| Others | Surfactant | — | 0.6 | 0.6 | 0.6 | 0.6 | 0.6 |
|  | Additive | — | 0.5 | 0.5 | 0.5 | 0.5 | 0.5 |
| Water |  | 23.5 | 71.9 | 71.9 | 75.9 | 75.85 | 71.9 |
| Total |  | — | 100 | 100 | 100 | 100 | 100 |
| Amount of solvent having Hansen SP value in a range of 9 to 13 |  | — | 4 | 4 | 0 | 0.05 | 4 |
| (Discharge amount per droplet ejection)/(volume of ink pressure chamber)} * 100 |  |  | 0.12 | 0.16 | 0.16 | 0.16 | 0.19 |
| Volume (pl) of ink pressure chamber |  |  | 6000 | 4500 | 4500 | 4500 | 4500 |
| Color density |  |  | A | C | A | C | C |
| Expression of thin line |  |  | C | A | A | A | A |
| Stability of the foreign matter |  |  | A | AA | A | AA | AA |
| Stability of discharge |  |  | AA | AA | D | AA | AA |
| Wash fastness |  |  | A | B | A | B | B |

2.2. Preparation of Ink Jet Printing Apparatus

As an ink jet printing apparatus which is provided with the head illustrated in FIGS. 1 to 3 as described above, a modified machine of SC-F2000 (manufactured by Seiko Epson Corporation) was prepared. As the head, a head H1 illustrated in FIG. 3 is used except for Comparative Example 1, and a head H2 of which the volume of the pressure chamber is larger than that of head H1 was used in Comparative Example 1.

Here, the head H1 has the structure illustrated in FIG. 3, and the length from a bottom surface of the pressure chamber 20 to the nozzle surface 13, that is, the distance of the connecting portion 132 (d1+d2) is 1000 μm, and the nozzle pitch is 300 dpi, the volume per pressure chamber 20 is 2900 pl, and the total volume (volume of ink pressure chambers) of the communication hole 127, the nozzle hole 12, and the volume per pressure chamber 20 is 4500 pl.

The head H2 has a structure similar to the head H1, and has the large volume of the pressure chamber, and the low nozzle density as compared with the head H1. In other words, the distance of the connecting portion 132 is 1000 μm, the nozzle pitch is 180 dpi, the volume per pressure chamber 20 is 3700 pl, and the total volume (volume of ink pressure chambers) of the communication hole 127, the nozzle hole 12, and the volume per pressure chamber 20 is 6000 pl.

2.3. Recording Test by Printing

A recording test by printing was performed on the fabric (HEAVYWEIGHT, manufactured by Haynes International, Inc., 100% cotton, white fabric). The fabric was set on the above-described printer, and the ink was discharged from the head so as to adhere to the fabric. Note that, an image was recorded by adhering the ink after adjusting {(discharge amount per droplet ejection)/(volume of ink pressure chamber)}×100 to be the values indicated in Tables 1 and 2. After the ink adhesion, the fabric was discharged out, and was heated at 170° C. or one minute for drying, thereby obtaining a printed material.

2.4. Evaluation of Printed Material 2.4.1. Evaluation of Color Density of Image $C^*$ value of an image of the printed material obtained in "2.3. Recording test by printing" was measured by using a colorimeter ("Gretag Macbeth Spectrolino", trade name, prepared by X-RITE), and was evaluated based on the following evaluation criteria.

Evaluation Criteria

AA: $C^*$ of 100% Duty portion is equal to or greater than 80

A: $C^*$ of 100% Duty portion is equal to or greater than 70 and lower than 80

B: $C^*$ of 100% Duty portion is equal to or greater than 60 and lower than 70

C: $C^*$ of 100% Duty portion is lower than 60

2.4.2. Evaluation of Thin Line Expression

In order to compare the head H1 (the nozzle pitch 300 dpi) with the head H2 (the nozzle pitch 180 dpi), the thin lines were printed under the following conditions including the printing time and the discharge weight per unit area, and then evaluated with the following evaluation criteria.

Conditions

H1: 600×600 dpi, 7 ng/shot

H2: 720×360 dpi, 10 ng/shot

Media: HEAVYWEIGHT T-shirt made by Print Star Co. (5.6 oz)

Evaluation Criteria

A: 0.05 mm of thin lines can be expressed without blur

B: 0.1 mm of thin lines can be expressed without blur

C: 0.1 mm of thin lines have blurred 2.4.3. Evaluation of Stability of Foreign Matter Ink was airtightly sealed in a flexible container of which an inner layer is covered with a polyethylene film (here, ink pack is used), was left for five days at 60° C., and then was evaluated with the following evaluation criteria.

Evaluation Criteria

AA: Foreign matter does not occur at all

A: Very few foreign matters occur

B: Slightly foreign matters occur

C: Large amount of foreign matters occur 2.4.4. Evaluation of Discharge Stability The long-term use was assumed in the recording conditions of the apparatus used in the recording test by printing, a non-discharge inspection of the nozzle was performed by continuously discharging ink from the head to an ink receiver provided on the platen side for three minutes, and the number of non-discharged nozzles with respect to the total number of the used nozzles was calculated, and was evaluated with the following evaluation criteria.

Evaluation Criteria

AA: Less than 1%

A: Equal to or greater than 1% and less than 3%

B: Equal to or greater than 3% and less than 5%

C: Equal to or greater than 5% and less than 10%

D: Equal to or greater than 10%

2.4.5. Evaluation of Washing Fastness

The printed material obtained in "2.3. Recording test by printing" was evaluated by a washing fastness test. The washing fastness test was performed based on "AATCC61 2A, 3A", and the evaluation was performed with the following evaluation criteria. Note that, in the following description, "2A" means that washing was performed at 25° C., and "3A" means that washing was performed at 60° C. 100% Duty portion is an image portion formed by the recording test by printing, and 50% Duty portion is an image portion formed in the same way as that of the 100% Duty portion except that the adhesion amount of ink is half of that of the 100% Duty portion.

Evaluation Criteria

AA: In condition 3A, dropout of the coating is not found in 50% Duty portion

A: In condition 3A, dropout of the coating is found in 50% Duty portion; whereas dropout of the coating is not found in 100% Duty portion B: Dropout of the coating is found even in 100% Duty portion in condition 3A; whereas dropout of the coating is not found even at 50% Duty portion in condition 2A C: In condition 2A, dropout of the coating is found even in 50% Duty portion 2.5. Result of Evaluation The evaluation results of the respective Examples and Comparative Examples are indicated in lower columns of Tables 1 and 2.

As indicated in the respective Examples based on Example 1 indicated in Table 1, the following results were obtained. In Example 2, when the solvent having the SP value of equal to or lower than 13 was excessively increased, the dispersion of the pigment became unstable, and the stability of the foreign matter was slightly deteriorated as compared with Example 1. In contrast, in Example 3, when the amount of the solvent having the SP value of equal to or lower than 13 was decreased, the dynamic surface tension was decreased, and the discharge stability was slightly deteriorated as compared with Example 1. In Example 4, although ethylene glycol monomethyl ether was used as the solvent having the SP value of equal to or lower than 13, the same result as that of Example 1 was obtained. In Example 5, when a solvent having a SP value which is lower than that of triethylene glycol monobutyl ether was used as the solvent having the SP value of equal to or lower than 13, the hydrophobicity of the solvent was enhanced, the dispersion of the pigment became unstable, and the stability of the foreign matter was deteriorated.

In Example 6, when a solvent having a SP value which is greater than that of triethylene glycol monobutyl ether was used, the dynamic surface tension was slightly increased, and the discharge stability is slightly deteriorated as compared with Example 1. In Example 7, as the pigment concentration was increased, the color density was increased; however, the stability of the foreign matter was deteriorated, and the discharge stability was also deteriorated. In contrast, in Example 8 in which the pigment concentration was decreased, the color density is deteriorated as compared with Example 1; however, the stability of the foreign matter was improved, and the discharge stability was also improved. In Example 9, although the diketopyrrolopyrrole pigment which is different from that of Example 1 was used, the same result as that of Example 1 was obtained, and the performance was not changed. After Example 10, even in a case where the solvent having the SP value of equal to or lower than 13 was formed in combination, the performance was not changed. After Example 11, it is possible to increase the amount of the solvent having the SP value of equal to or lower than 13 up to 11%; however, as the amount increased, the dispersion of the pigment became unstable and the stability of the foreign matter was slightly deteriorated.

Further, in Example 12, when the amount of the solvent having the SP value of equal to or lower than 13 was decreased as compared with Example 3, the discharge stability was further deteriorated. In Example 13, when the amount of the solvent having the SP value of equal to or lower than 13 was increased as compared with Example 2, the stability of the foreign matter was further deteriorated. In Example 14, {(discharge amount per droplet ejection)/(volume of ink pressure chamber)}×100 was the value greater than the range suitable for the invention, and thus the cavitation occurred, and the discharge stability was deteriorated as compared with Example 1. In Example 15, when a solvent having a SP value of lower than 9 was used as the solvent having the SP value of equal to or lower than 13, while the ink easily followed the movement of the piezo ink jet head, the balance with the dispersibility of the ink absorbed by a plastic base material such as an ink pack was likely to be collapsed, and thereby the foreign matters occurred.

With respect to Examples, in Comparative Example 1, the volume of the ink pressure chamber was large, and {(discharge amount per droplet ejection)/(volume of ink pressure chamber)}×100 was the value smaller than the range of the invention, and thus the ink did not sufficiently land, and the thin line expression was deteriorated. In Comparative Example 2, an azo pigment was used as a pigment, and thus the dispersibility of the pigment was excellent, and the stability of the foreign matter was also excellent; however, the color density was deteriorated. In Comparative Example 3, the SP value was out of the range of the invention, and thus the ink was difficult to follow the movement of the piezo ink jet head. Therefore, the ink discharge became unstable, thereby resulting in a large number of non-discharged nozzles. In Comparative Example 4, in a case of the azo pigment, the hydrophobicity of the pigment was not high, and thus there was no need to adjust the SP value by the solvent, and the same result as that of Comparative Example 2 was obtained. In Comparative Example 5, {(discharge amount per droplet ejection)/(volume of ink pressure chamber)}×100 was the value greater than the range suitable for the invention; however, the same result as that of Comparative Example 2 was obtained, and in the case of the azo pigment, it was found that the cavitation did not occur even if the exclusion volume was excessively large, and the discharge stability was not affected.

The invention is not limited to the above-described embodiment, and various modifications can be performed. For example, the invention includes substantially the same configuration (for example, a configuration having the same function, method, and result, or a configuration having the same object and effect) as the configuration described in the embodiment. Further, the invention includes a configuration in which non-essential parts of the configuration described in the embodiment are replaced. Further, the invention includes a configuration that achieves the same operation and effect, or can achieve the same object as the configuration described in the embodiment. Further, the invention includes a configuration in which a well-known technique is added to the configuration described in the embodiment.

The entire disclosure of Japanese Patent Application No. 2016-075655, filed Apr. 5, 2016 is expressly incorporated by reference herein.

What is claimed is:

1. An image forming method comprising:
discharging an ink jet ink composition which contains a diketopyrrolopyrrole pigment and a solvent having a SP value of equal to or lower than 13 by using an apparatus which includes a piezo ink jet head satisfying the following Expression (1), $0.13 \leq \{(\text{discharge amount per droplet ejection})/(\text{volume of ink pressure chamber})\} \times 100.$ 2. The image forming method according to claim 1, wherein the apparatus which includes the piezo ink jet head further satisfies the following Expression (2), $0.13 \leq \{(\text{discharge amount per droplet ejection})/(\text{volume of ink pressure chamber})\} \times 100 \leq 0.18.$ 3. The image forming method according to claim 1, wherein the SP value of the solvent is equal to or greater than 9.

4. The image forming method according to claim 1, wherein the ink jet ink composition contains the solvent in a range of 0.1% by mass to 10% by mass with respect to the total mass of the ink jet ink composition.

5. The image forming method according to claim 1, wherein a recording medium is fabric.

6. The image forming method according to claim 1, wherein the ink jet ink composition is an aqueous ink composition.

7. The image forming method according to claim 1, wherein the diketopyrrolopyrrole pigment is Pigment Red 254 or Pigment Red 255.

8. The image forming method according to claim 1, wherein the solvent includes a solvent having a SP value in a range of 9.5 to 11.5.

9. The image forming method according to claim 1, wherein the ink jet ink composition contains the solvent in a range of 0.5% by mass to 5% by mass with respect to the total mass of the ink jet ink composition.

10. The image forming method according to claim 1, wherein in the ink jet ink composition, the solid concentration of the diketopyrrolopyrrole pigment is in a range of 3% by mass to 10% by mass with respect to the total mass of the ink jet ink composition.

11. The image forming method according to claim 1, wherein the solvent is alkylene glycol monoalkyl ether.

* * * * *